(12) United States Patent
Lection

(10) Patent No.: US 9,569,072 B2
(45) Date of Patent: *Feb. 14, 2017

(54) METHODS, SYSTEMS, AND COMPUTER READABLE MEDIA FOR CONTROLLING PRESENTATION AND SELECTION OF OBJECTS THAT ARE DIGITAL IMAGES DEPICTING SUBJECTS

(71) Applicant: Scenera Technologies, LLC, Portsmouth, NH (US)

(72) Inventor: David B. Lection, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,318

(22) Filed: Jan. 8, 2016

(65) Prior Publication Data

US 2016/0117066 A1 Apr. 28, 2016

Related U.S. Application Data

(63) Continuation of application No. 14/682,148, filed on Apr. 9, 2015, now Pat. No. 9,235,336, which is a (Continued)

(51) Int. Cl.
*G06F 3/0482* (2013.01)
*G06F 17/30* (2006.01)
(Continued)

(52) U.S. Cl.
CPC ......... *G06F 3/0482* (2013.01); *G06F 3/04817* (2013.01); *G06F 3/04842* (2013.01);
(Continued)

(58) Field of Classification Search
CPC ............... G06F 3/00; G06F 3/01; G06F 3/16; G06F 3/016; G06F 3/017; G06F 3/041; G06F 3/048; G06F 3/0481; G06F 3/0482; G06F 3/0484; G06F 3/04817; G06F 9/4443; G06F 1/1626; G06F 17/2247; G06F 17/30864; G06F 17/30286
See application file for complete search history.

(56) References Cited

U.S. PATENT DOCUMENTS 6,416,325 B2   7/2002   Gross
6,539,232 B2   3/2003   Hendrey et al.
(Continued)

OTHER PUBLICATIONS

Watson, "Digital.Cameras.And.Genealogy," [online] Ken Watson, Copyright 2003-2005 [retrieved on Jun. 29, 2007] Retrieved from the Internet: <URL: http://www.rideau-info.com/genealogy/digital/label.html> 4 pages.

(Continued)

*Primary Examiner* — Xiomar L Bautista

(57) ABSTRACT

The subject matter described herein is directed to controlling presentation and selection of objects that are digital images depicting subjects. According to one aspect, a plurality of objects is presented via a presentation device having a screen. Each object is associated with at least one other object of plurality of objects and is a digital image of a subject. A first object presented is selected in response to a first selection event associated with the first object. A second object non-adjacent to the first object is determined based on a predefined relationship associating the first object with the second object, wherein the second object is on-screen or off-screen. The second is presented via the presentation device on-screen and adjacent to the first object in response to the determination. An indication of the predefined relationship is also presented.

22 Claims, 8 Drawing Sheets

Related U.S. Application Data continuation of application No. 14/215,250, filed on Mar. 17, 2014, now Pat. No. 9,015,635, which is a continuation of application No. 13/246,215, filed on Sep. 27, 2011, now Pat. No. 8,694,921, which is a continuation of application No. 11/956,920, filed on Dec. 14, 2007, now Pat. No. 8,037,425.

(51) Int. Cl.
*G06F 3/0481* (2013.01)
*G06F 3/0484* (2013.01)
*G06F 3/16* (2006.01)

(52) U.S. Cl.
CPC ........ *G06F 3/167* (2013.01); *G06F 17/30017* (2013.01); *G06F 17/30265* (2013.01)

(56) References Cited

U.S. PATENT DOCUMENTS

| | | | |
|---|---|---|---|
| 6,961,731 | B2 | 11/2005 | Holbrook |
| 2002/0018138 | A1 | 2/2002 | Yoshiro |
| 2003/0191766 | A1 | 10/2003 | Elin |
| 2003/0225837 | A1 | 12/2003 | Delia et al. |
| 2004/0098379 | A1 | 5/2004 | Huang |
| 2005/0001024 | A1* | 1/2005 | Kusaka .............. H04N 1/00281 235/375 |
| 2005/0015710 | A1 | 1/2005 | Williams |
| 2005/0018057 | A1 | 1/2005 | Bronstein et al. |
| 2005/0021659 | A1* | 1/2005 | Pilu ................... G06F 17/30864 709/213 |
| 2006/0075035 | A1 | 4/2006 | Tripp |
| 2006/0242122 | A1 | 10/2006 | Devorchik et al. |
| 2006/0242164 | A1 | 10/2006 | Evans et al. |
| 2006/0251339 | A1 | 11/2006 | Gokturk et al. |
| 2006/0287876 | A1 | 12/2006 | Jedlicka |
| 2007/0004390 | A1 | 1/2007 | Kraft et al. |
| 2007/0067295 | A1 | 3/2007 | Parulski et al. |
| 2008/0062283 | A1 | 3/2008 | Matsushita et al. |
| 2008/0080745 | A1 | 4/2008 | Vanhoucke et al. |
| 2008/0104032 | A1 | 5/2008 | Sarkar |
| 2008/0109327 | A1 | 5/2008 | Mayle et al. |
| 2008/0168390 | A1 | 7/2008 | Benyamin |
| 2008/0244375 | A1 | 10/2008 | Gentile et al. |
| 2008/0306995 | A1 | 12/2008 | Newell et al. |
| 2009/0119333 | A1 | 5/2009 | Sundstrom et al. |
| 2009/0225191 | A1 | 9/2009 | Tachikawa et al. |

OTHER PUBLICATIONS

Kustanowitz, J., et al., "Motivating Annotation for Personal Digital Photo Libraries: Lowering Barriers While Raising Incentives," JCDL-05, Jun. 7-11, 2005, Denver, Colorado, USA, 10 Pages.

* cited by examiner

Figure 7A

| Generation | Genealogical Immutable | Genealogical Coincidental |
|---|---|---|
| Grand Parent | Brother, Sister | Spouse, Step Brother, Step Sister Step child |
| Parent | Brother, Sister | Spouse, Step Brother, Step Sister Step child |
| Child | Brother, Sister | Spouse, Step Brother, Step Sister Step child |
| Grandchild | Brother, Sister | Spouse, Step Brother, Step Sister |

Figure 7B

| Generation | Car Immutable | Car Coincidental |
|---|---|---|
| Car Manufacturing Group | Daimler-Chrysler | Partner Car Manufacturer Suzuki |
| Car Manufacturing Brand | Sibling Brands Plymouth : Dodge | Partner Car Manufacturer Brand Suzuki America |
| Car Manufacturing Line | Sibling Lined Belvidere : Polara | Partner Manufacturing Line Forenza |

METHODS, SYSTEMS, AND COMPUTER READABLE MEDIA FOR CONTROLLING PRESENTATION AND SELECTION OF OBJECTS THAT ARE DIGITAL IMAGES DEPICTING SUBJECTS

CROSS-REFERENCE TO RELATED APPLICATIONS

This application is a continuation of U.S. patent application Ser. No. 14/682,148 titled "Methods, Systems, and Computer Readable Media For Controlling Presentation and Selection of Objects That Are Digital Images Depicting Subjects," filed on Apr. 9, 2015 (now U.S. Pat. No. 9,235,336 issued Jan. 12, 2016), which is a continuation of U.S. patent application Ser. No. 14/215,250 titled "Methods, Systems, and Computer Readable Media For Controlling Presentation and Selection of Objects That Are Digital Images Depicting Subjects," filed on Mar. 17, 2014 (now U.S. Pat. No. 9,015,635 issued Apr. 21, 2015), which is a continuation of U.S. patent application Ser. No. 13/246,215 titled "Methods, Systems, and Computer Readable Media For Controlling Presentation and Selection of Objects That Are Digital Images Depicting Subjects," filed on Sep. 27, 2011 (now U.S. Pat. No. 8,694,921 issued Apr. 8, 2014), which is a continuation of U.S. patent application Ser. No. 11/956,920 titled "Methods, Systems, and Computer Readable Media For Controlling Presentation and Selection of Objects That Are Digital Images Depicting Subjects," filed on Dec. 14, 2007 (now U.S. Pat. No. 8,037,425 issued Oct. 11, 2011, the entire disclosures of which are hereby incorporated by reference herein.

BACKGROUND

Digital images, such as photographs taken using digital cameras, scanned images, and images generated with the aid of a computer, often contain multiple subjects. For example, a digital image may depict multiple people, places, or objects.

In order to facilitate later viewing or interpretation of digital images, it may be desirable to associate with the digital images information concerning the subjects depicted in the images. For example, if an image is a digital photograph, it may be desirable to associate with the digital photograph information concerning the subjects depicted in the photograph. In addition, when using a digital camera to take a photograph, it may be desirable to pre-associate with the photograph information concerning subjects that will be depicted in the photograph.

Current digital photograph editing software allows manual annotation of photographs. However, manual annotation is labor intensive and is therefore undesirable when large numbers of photographs require annotation. Current digital camera user interfaces allow the user to automatically annotate digital photographs with time and date information. However, there is no easy method to navigate and select subjects of a digital photograph either prior to or after creation of the photograph.

Accordingly, there exist a need for methods, systems, and computer readable media for controlling presentation and selection of objects that are digital images depicting subjects.

SUMMARY

The subject matter described herein includes methods, systems, and computer readable media for controlling presentation and selection of objects that are digital images depicting subjects. According to one aspect, the subject matter described herein includes a method for controlling presentation and selection of objects that are digital images depicting subjects. The method includes presenting, via a presentation device having a screen, a plurality of objects. Each of at least one object is associated with at least one other object of the plurality of objects. Each of the objects is a digital image depicting a subject. A portion of the plurality of objects is off-screen. The method further includes selecting a first object presented in response to a first selection event associated with the first object. The method further includes determining a second object based on a predefined relationship associating the first object with the second object. The second object is at least one of on-screen and off-screen. The method further includes presenting, via the presentation device, the second object on-screen and adjacent to the first object in response to the determination and an indication of the predefined relationship.

According to another aspect of the subject matter described herein, a system for controlling presentation and selection of objects that are digital images depicting subjects is provided. The system includes an object selection rendering subsystem for presenting, via a presentation device having a screen, a plurality of objects. Each of at least one object is associated with at least one other object of the plurality of objects. Each of the objects is a digital image depicting a subject. A portion of the plurality of images is off-screen. The system further includes a navigation and selection subsystem for selecting a first object presented in response to a first selection event associated with the first object. The system further includes an object dataset access component for determining, using an object dataset, a second object based on a predefined relationship associating the first object with the second object. The second object is at least one of on-screen and off-screen. The object selection rendering subsystem is adapted to present, via the presentation device, the second object on-screen and adjacent to the first object in the response to the determination and an indication of the predefined relationship.

According to another aspect of the subject matter described herein, a system for controlling presentation and selection of objects that are digital images depicting subjects is provided. The system includes means for presenting, via a presentation device having a screen, a plurality of objects. Each of at least one object is associated with at least one other object of the plurality of objects. Each object is a digital image depicting a subject. A portion of the plurality of objects is off-screen. The system further includes means for selecting a first object presented in response to a first selection event associated with the first object. The system further includes means for determining a second object based on a predefined relationship associating the first object with the second object. The second object is at least one of on-screen and off-screen. The system further includes means for presenting, via the presentation device, the second object on-screen and adjacent to the first object in response to the determination and an indication of the predefined relationship.

According to another aspect, a computer readable medium embodying a computer program executable by a machine, for controlling presentation and selection of objects that are digital images depicting subjects is provided. The computer program includes executable instructions for presenting, via a presentation device having a screen, a plurality of objects, wherein each of at least one object is associated with at least one other object in the plurality of objects and a portion of the plurality of objects is off-screen. Each object is a digital image depicting a subject. The computer program further includes instructions for selecting a first object presented in response to a first selection event associated with the first object. The computer program further includes instructions for determining a second object based on a predefined relationship associating the first object with the second object. The second object is at least one of on-screen and off-screen. The computer program further includes instructions for presenting, via a presentation device, the second object on-screen and adjacent to the first object in response to the determination and an indication of the predefined relationship.

BRIEF DESCRIPTION OF THE DRAWINGS

Preferred embodiments of the subject matter described herein will now be explained with reference to the accompanying drawings of which:

FIGS. 7A and 7B are tables illustrating exemplary relationships between objects according to an embodiment of the subject matter described herein.

DETAILED DESCRIPTION

The subject matter described herein includes methods, systems, and computer readable media for controlling presentation and selection of objects that are digital images depicting subjects. The following definitions are used herein to describe certain aspects of the subject matter described herein.

Emphasis Selection Event: A specialized selection event on a device that both selects an item and performs an action within the context of an item. An example embodiment of this type of event can be generated by a double click on a button of a personal computer pointing device, such as a mouse.

Immutable Relationship: A subject that has an immutable relationship to another subject in a relationship hierarchy has a relationship that can never be altered. For example, an offspring subject has a relationship to his or her parents that is immutable. The parent-offspring biological relationship is durable forever. Once the offspring is born, the relationship cannot be altered or rescinded, even upon the death of the subject or the offspring, the relationship remains true.

Coincidental Relationship: A subject has a coincidental relationship to another subject in the hierarchy if the relationship is non-immutable. A coincidental relationship may be formed between two subjects based on a contract. For example, a spouse of a subject is coincidentally related to the subject through the contract of a marriage. An adopted child and stepchild are also examples of children who may be coincidentally related to a parent. Coincidental and immutable relationships are not necessarily unique to family situations.

Figure 1:
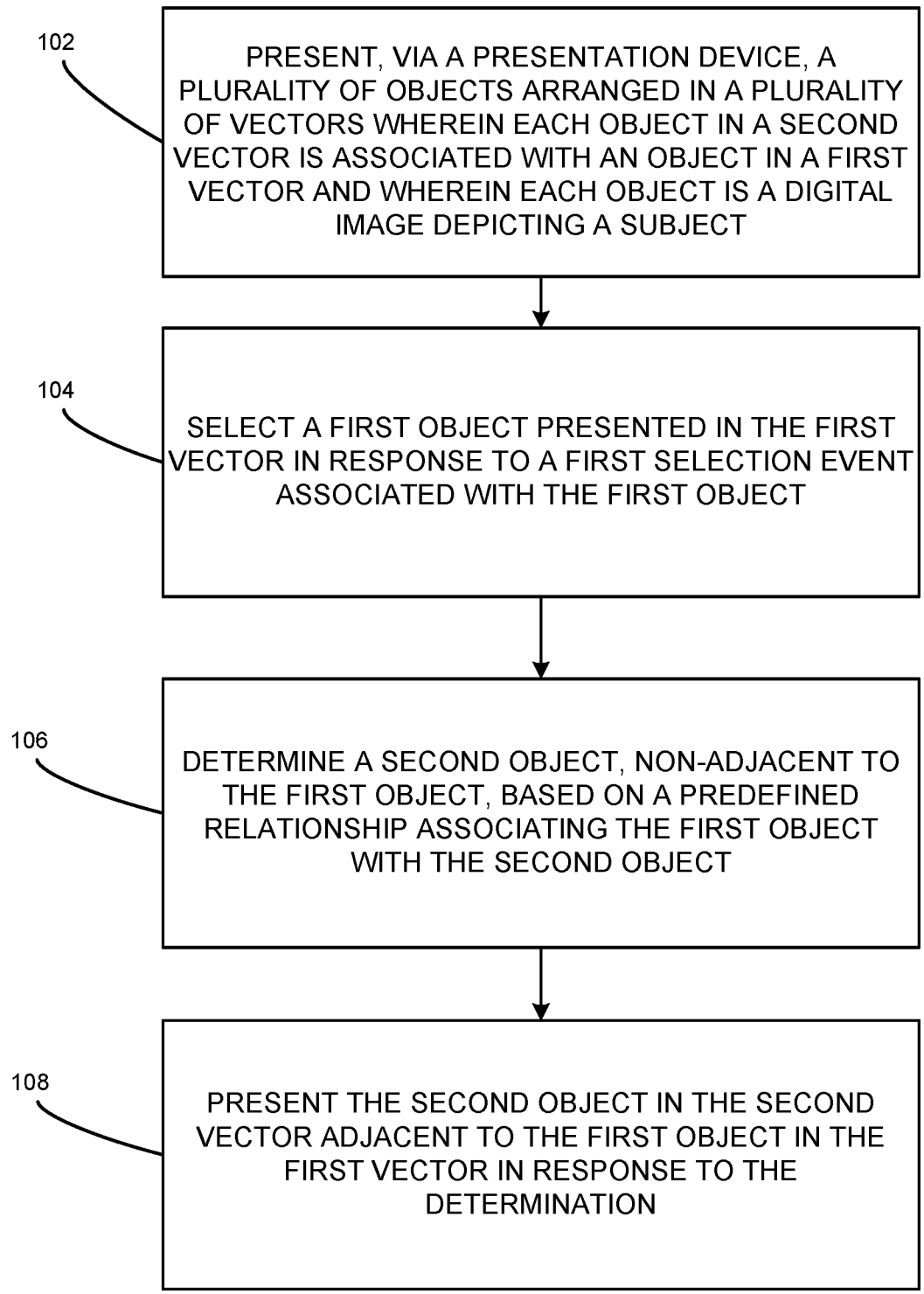
FIG. 1 is a flow chart illustrating an exemplary process for controlling presentation and selection of objects that are digital images depicting subjects according to an embodiment of the subject matter described herein.

According to one aspect, the subject matter described herein includes a method for controlling presentation and selection of objects that are represented by digital image subjects. FIG. 1 is a flow chart illustrating an exemplary method for controlling presentation and selection of objects that are digital images depicting subjects according to an embodiment of the subject matter described herein. Referring to FIG. 1, in block 102, a plurality of objects arranged in a plurality of vectors is presented via a presentation device, wherein each object in a second vector is associated with an object in a first vector and wherein each object is a digital image depicting a subject. For example, objects that are digital image thumbnails of subjects depictable in digital photographs, digital video frames, computer-generated images, or scanned images may be presented in constructs referred to herein as vectors. Examples of presentation of objects in vectors will be described in detail below. Each object in one vector may be associated with an object in another vector. For example, one vector may contain objects representing one generation in a family and another vector may contain objects representing a subsequent generation.

Figure 2:
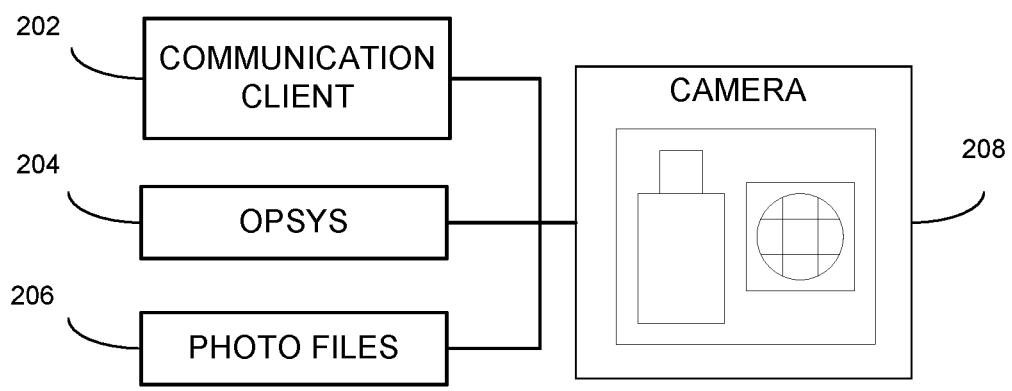
FIG. 2 is a block diagram illustrating a camera and exemplary software components that may reside on the camera.
Figure 3:
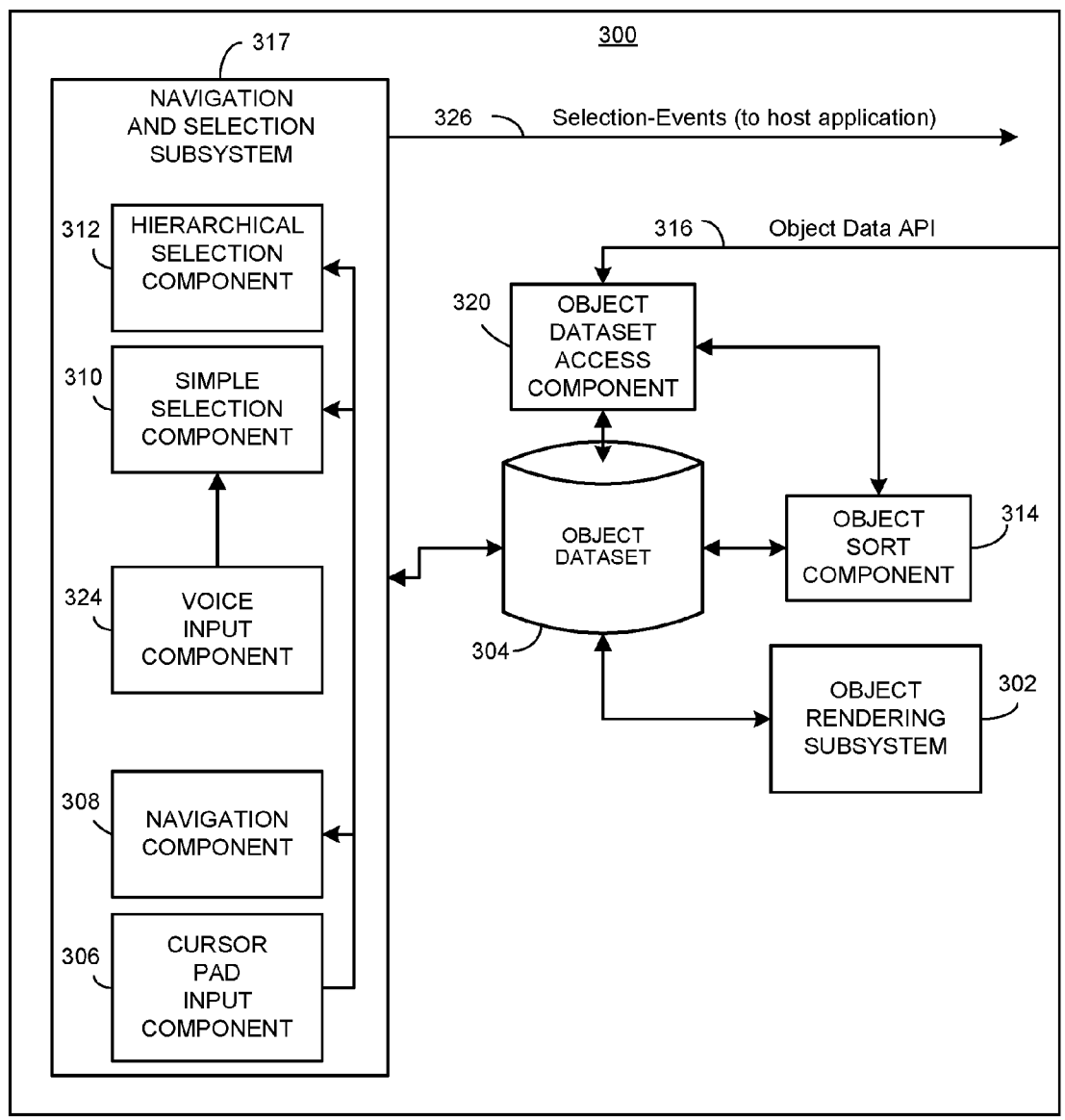
FIG. 3 is a block diagram illustrating an exemplary system for controlling presentation and selection of objects that are digital images depicting subjects according to an embodiment of the subject matter described herein.

The subject matter described herein includes means for presenting, via a presentation device, a plurality of objects arranged in a plurality of vectors, wherein each object in a second vector is associated with an object in the first vector and wherein each object is digital image depicting a subject. For example, in FIG. 2, which illustrates a camera and exemplary software components of a camera, software that controls presentation and selection of digital images may be implemented in operating system 202 of camera 204 or in an application that runs on operating system 202. Other software that may reside on camera 204 is a communication client 206 which communicates with another device and photo files 208, which may be the digital images for which subjects are identified. FIG. 3 illustrates exemplary components of an object presentation and control system 300 according to an embodiment of the subject matter described herein. Referring to FIG. 3, an object selection rendering subsystem 302 performs the operations listed in block 102 of FIG. 1. For example, object selection rendering subsystem 302 performs rendering for object selection and control. Object selection rendering subsystem 302 renders information for each subject by retrieving media objects and subject information, including image thumbnails, from object dataset 304. In one implementation, the subject information retrieved for each object may be associated as metadata with a digital image that depicts each subject. An object dataset access component 320 may facilitate extraction of objects and associated information from object dataset 304. Object dataset 304 may be implemented using a hierarchical data store that stores data for each object to be presented and/or selected.

Figure 4:
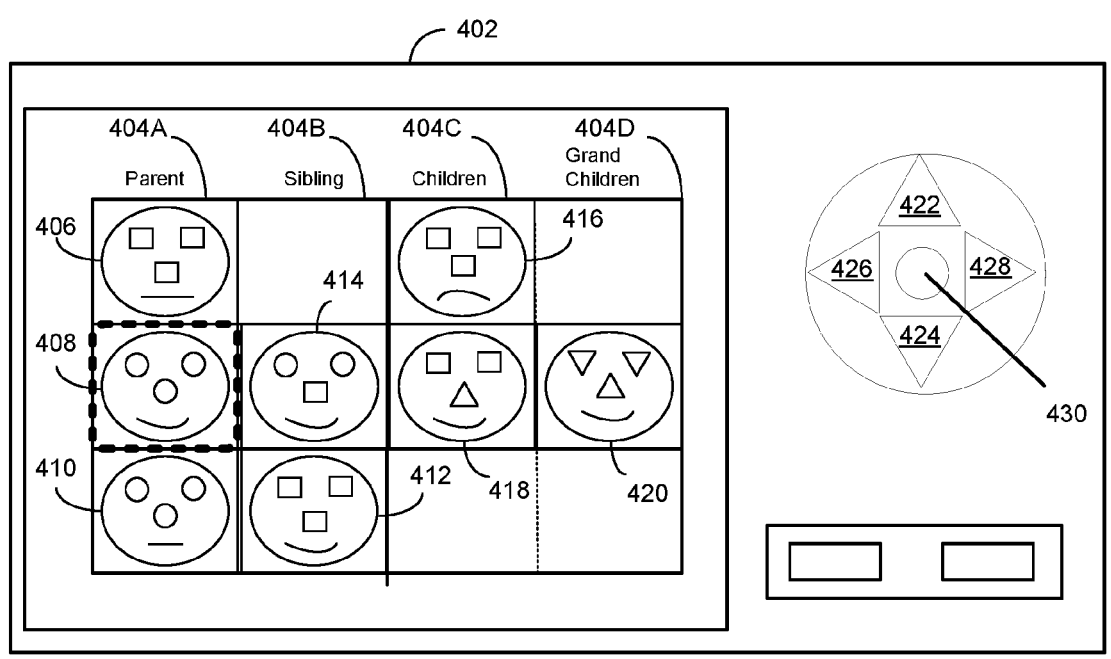
FIG. 4 is a block diagram illustrating an exemplary object selection and presentation control instance in which objects that are digital images depicting subjects are arranged in vectors according to an embodiment of the subject matter described herein.

In the context of usage within a digital camera, object presentation and selection control system 300 may be implemented as an application that creates an instance of object selection and presentation control. FIG. 4 is a block diagram illustrating an instance of an object selection and presentation control that may be created by system 300 according to an embodiment of the subject matter described herein. Referring to FIG. 4, object selection and presentation control instance 402 may include a graphical presentation of objects that are digital images depicting subjects, where the objects are arranged in vectors. In the illustrated example, each vector 404A-404D is a column of objects 406, 408, 410, 412, 414, 416, 418, and 420 that are digital images depicting subjects. In the illustrated example, vector 404A represents parent objects, vector 404B represents sibling objects, vector 404C represents children objects, and vector 404D represents grandchildren objects. In one exemplary implementation, each vector 404A-404D may be a circular construct with a portion of the objects in each construct visible on a display, a portion of the objects in each construct not visible on the display, and where visible and non-visible portions in each construct are linked together such that a last displayed object in the construct will be followed by the display of a first displayed object in the construct in response to a user navigation event. Using vector 404A as an example, objects 406, 408, and 410 are visible to a user. Other objects may be off screen such that when user navigation event is detected, for example, actuation of one of keys 422 and 424, off screen objects in vector 404A become visible and currently displayed objects in vector 404A may be scrolled off screen.

When object selection and presentation control instance 402 is instantiated, object data application programming interface (API) component 316 illustrated in FIG. 3 may load object selection and presentation control instance 402 with information related to each object. Calls to API 316 may be processed by object dataset access component 320, and object dataset 304 may be loaded with each subject's information, including relationship information. System 300 may call object data API component 316 passing an object, (e.g., an image thumbnail of a subject), relationship information for other related objects, and a correlation ID for the object. At a later time when object selections are retrieved by system 300, the correlation IDs may be used by system 300 to identify selected objects. Other subject information may be stored in object dataset 304. For example, as will be described in detail below, media phrases and synthesized speech may be stored for each object to support speech and other media functions associated with object presentation and selection.

Object dataset 304 may include any suitable structure that allows relationships between objects to be defined and that allows storage or association with information identifying the subjects corresponding to each object. In one example, dataset 304 may be implemented as a hierarchical dataset. In the hierarchical dataset, each record in dataset 304 may be a node in a tree hierarchy. Each node may contain a number of items, examples of which will now be described.

One data item that may be included in each node is an image thumbnail. The image thumbnail may be presented by object selection and presentation control instance 402. Subjects may be selected by visual recognition of the corresponding object displayed by object selection and presentation control instance 402. Objects 406-420 are examples of image thumbnails that may be stored in object dataset 304. Another data item that may be stored in a record of object dataset 304 is a record pointer or record pointer array, which can be used to reference other node references in object dataset 304. It is these nodes and references to other nodes within a node that can be used to form a relationship hierarchy.

Yet another data item that may be stored in a record in dataset 304 is a node type or node type array. This array can store an indicator for each record pointer with the following values. If the value of node_type[current-subject-record-number] is "peer_node" subject then the reference node is peer of the subject in the current node. Subject peers are considered in the same generation as the subject. If the value of node_type[current-subject-record-number] is "child_node" then the subject in the reference node is a logical child of the subject in the current node. Child subjects are considered to be in the next generation.

Yet another data item that may be stored in each record in object dataset 304 is a relation type or relation type array. This array holds an indicator for each record pointer with the following values: If the value of node_type[current-subject-record-number] is "immutable" then the subject in the reference node has an immutable relationship to the peer or child being referenced. An example of an immutable relationship is the relation between a father and a biological son. If the value of node_type[current-subject-record-number] is "coincidental" then the subject in the referenced node has a coincidental relationship. An example of a coincidental relationship is the relationship between a father and a stepson. Each level of nodes in dataset 304 may represent a generation.

In one exemplary implementation, subjects in the hierarchy in the same logical generation are displayed in the same column vector in object selection and presentation control instance 402. In the example illustrated in FIG. 4, vector 404A corresponds to a first display column in object selection and presentation control instance 402 and may contain objects in a first generation. Vector 404A may contain root node of the hierarchy of nodes stored in object dataset 304. Vector 404B may contain a subordinate generation of objects. In object selection and presentation control instance 402 illustrated in FIG. 4, each subordinate generation in the hierarchy is displayed to the right of the previous generation. However, any suitable arrangement can be used to illustrate relationships between objects. For example, subordinate generations could be stored to the left of, above, or below previous generations.

Figure 5A:
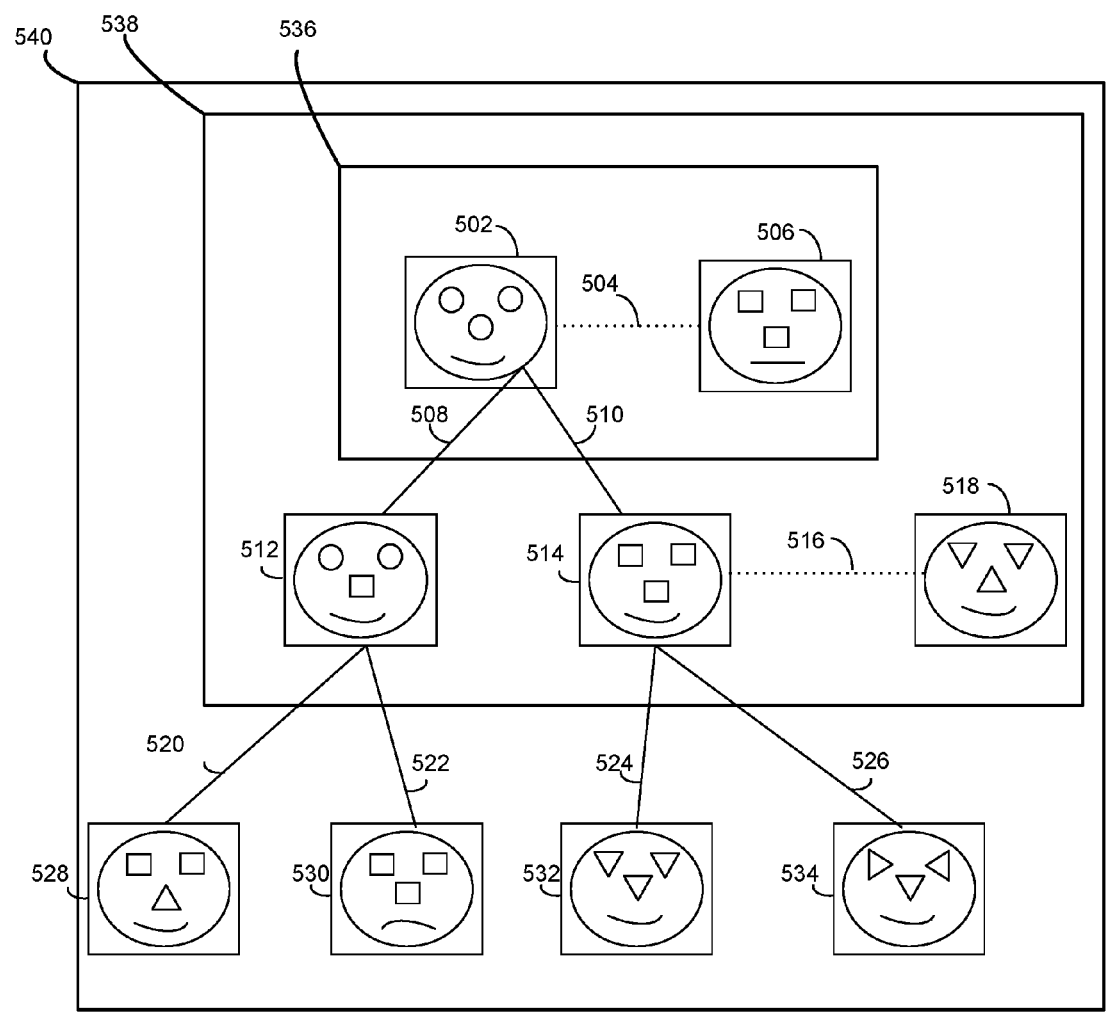
FIG. 5A is a block diagram illustrating an exemplary of hierarchy of objects that may be stored in an object dataset according to an embodiment of the subject matter described herein.

FIG. 5A is a block diagram illustrated in an example of a hierarchy that may be maintained in object dataset 304. In FIG. 5A, object 502 is located at the root node of the hierarchy. Object 506 is a peer of root object 502. Dotted line 504 denotes object 506 as being a coincidental peer of root object 502. In the context of a family, the subject represented by object 506 could be a spouse or a step-sibling of the subject represented by object 502. Objects 502 and 506 are in the same level of the hierarchy and may be displayed in the same vector in object selection and presentation control instance 402.

If an object is a child node, then that object is considered to be in the next subordinate generation relative to the current generation. In FIG. 5A, objects 512, and 514 are children of object 502. Solid lines 508 and 510 represent an immutable relationship between object 502 and object 514. Object 518 has a coincidental relationship, such as marriage, with object 514 as indicated by dotted line 516.

In object selection and presentation control instance 402, nodes 512, 514, and 518 would be displayed in the next adjacent column to the column where objects 502 and 506 are displayed. The relationship between the nodes would be dictated by the hierarchy in object dataset 304. In object selection and presentation control instance 402 illustrated in FIG. 4, objects 412 and 414 in vector 404B may be the next subordinate generation of objects in relation to objects 406, 408, and 410 stored in vector 404A.

Objects 528 and 530 are children of object 512. Solid lines 520 and 522 represent immutable relationships between object 512 and objects 528 and 530. Similarly, objects 532 and 534 are children of object 514. Solid lines 524 and 526 represent immutable relationships between object 514 and objects 532 and 534.

One data item that may be represented in object dataset 304 is a relationship state indicator that indicates whether the referenced node is an immutable relationship node or a coincidental relationship node. Object dataset 304 may determine whether the selected node is a coincidental relationship node based on the relationship state indicator during the processing of the selection event, as will be described in detail below.

The references stored in each record in dataset 304 determine relationships between related nodes and their respective generations. The relationships may be used to control presentation of objects and affect selection operations performed using object selection and presentation control instance 402.

Object dataset access component 320 may return an image thumbnail for each object in database 304 for display in the display area of object selection and presentation control instance 402. In FIG. 4, object selection and presentation control instance 402 appears on a display screen on a digital camera. Actuators 422, 424, 426, and 428 may allow a user to navigate between displayed objects. Actuator 430 may allow a user to select a displayed object. In the illustrated example, a selection cursor indicated by a bold dashed box appears around object 408. When the user presses actuator 430 the first time that the selection cursor is on an object, that object may be selected.

Object selection and presentation control instance 402 allows a user to select subjects for a photograph before or after the photograph is taken. In one implementation, a camera may be pre-loaded with images and relationships of potential subjects.

Although in the example illustrated in FIG. 4, objects are arranged in vertical vectors, any suitable arrangement for displaying objects may be used. For example, members of a given generation can be arranged in a horizontal direction with additional generations displayed in adjacent horizontal rows above or below the initial horizontal row. In addition, in a three dimensional space, an initial layout direction for the first vector may be along any display vector in the three dimensional space, with the adjacent display vectors being arranged adjacent and parallel to the first display vector.

Returning to FIG. 1, in block 104, a method for selecting and controlling display of objects that are digital images depicting subjects includes selecting a first object presented in a first vector in response to a first selection event associated with the first object. For example, in FIG. 4, object 408 in vector 404A may be selected by placing the cursor over object 408 using selection controls 422, 424, 426, or 428 and actuating selection actuator 430. Accordingly, a system for controlling selection and presentation of objects that are digital images depicting subjects includes means for selecting first object presented in the first vector in response to a first selection event associated with the first object. For example, navigation and selection subsystem 317 illustrated in FIG. 3 may process navigation and selection events implemented using object selection and presentation control instance 402 illustrated in FIG. 4. Navigation and selection subsystem 317 may include a navigation component 308 that processes navigation events, simple and hierarchical selection components 310 and 312 that process selection events, and voice and cursor pad input components 324 and 306 that respectively process voice and tactile input for selection and/or navigation. Navigation and selection subsystem 317 may output selection events 326 to an associated application that has created and is using an instance of the control for the selection of subjects.

In FIG. 4, actuators 422, 424, 426, 428, and 430 may be implemented using hardware buttons. In an alternate implementation, the actuators may be displayed on an LCD panel and may be activated by touch. Other kinds of input devices may be used to provide actuation, selection, and navigation events. Exemplary input devices suitable for use with embodiments of the subject matter described herein include a personal computer based pointed device, such as a mouse or a joystick. On a mobile phone, a cursor and hardware or software implemented actuators to control selection of objects using a cursor may be used utilized. In addition, as will be described in more detail below, media phrase recognition may be used to select objects.

In FIG. 4, object selection and presentation control instance 402 may support at least the following modes of selection: simple selection mode and hierarchical selection mode. Simple selection mode will be described in detail below. Hierarchical selection allows multiple objects to be selected in object selection and presentation control instance 402 without having to navigate each object and select the object. Hierarchical selection may begin with selection of an initial object. The initial object can be located at any position in the display area of object selection and presentation control instance 402.

Hierarchical selection may begin when object selection and presentation control instance 402 receives via cursor pad input component 306 an emphasis selection event. In the context of a digital camera as shown in FIG. 4, an emphasis selection event may be generated by pressing selection actuator component 430 twice in rapid succession.

An emphasis selection event may be similar to a double click event that is generated using a pointing device of a personal computer. Some cameras may also support a press and hold function by selection actuator component 430 to generate the emphasis selection event. In this case, the button is pressed and held in the pressed state until a time threshold is exceeded and the button is released. Some cameras may provide tactile or audible feedback when the hold time threshold is exceeded to notify the user that the emphasis selection function has been invoked.

Figure 6A:
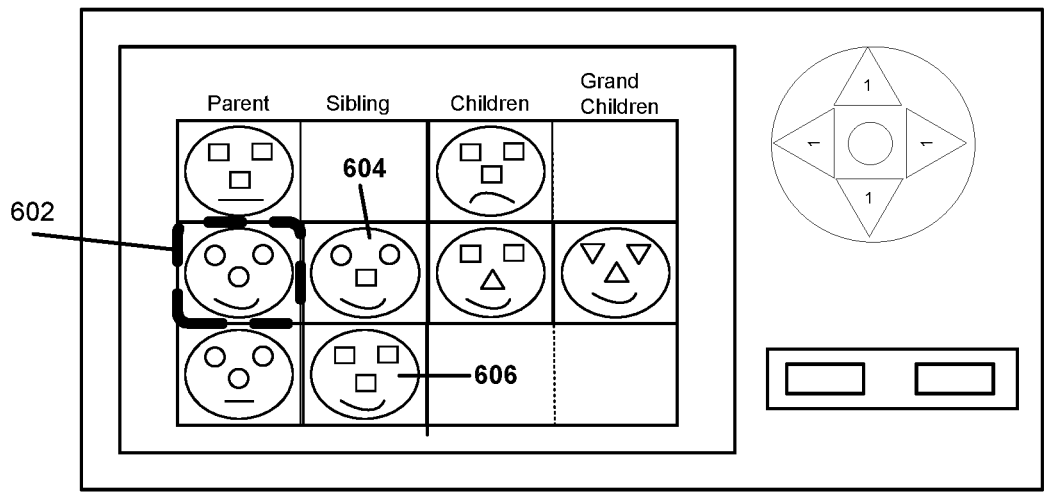
FIGS. 6A-6C are block diagrams illustrating an object selection and presentation control instance where objects are arranged in vectors and illustrating selection and presentation of objects in different vectors according to an embodiment of the subject matter described herein.
Figure 6B:
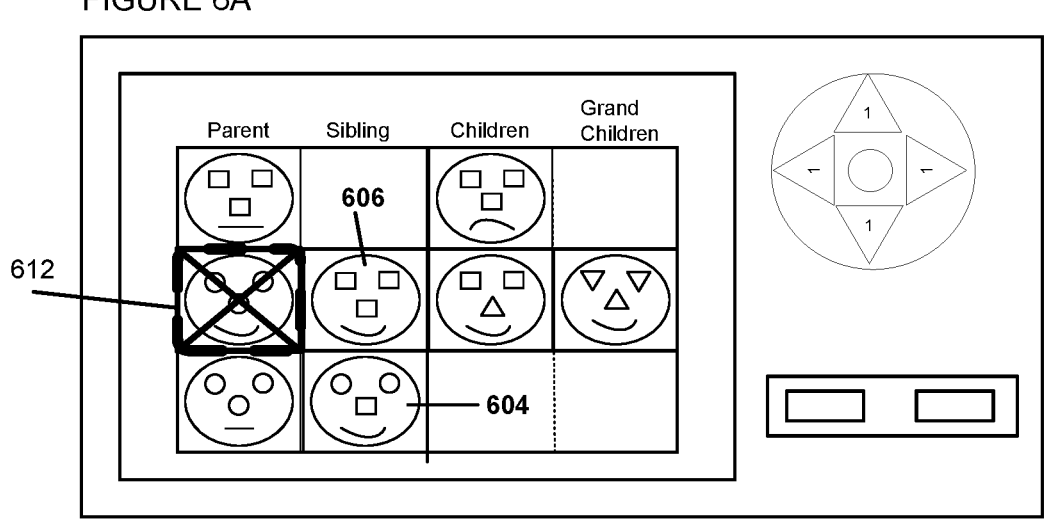

Upon receipt of input, cursor pad input component 306 forwards the emphasis selection event to hierarchical selection component 312 for processing. The selection event contains an x and y location of the selection cursor within object selection and presentation control instance 402 of FIG. 4. From the x and y location of the selection cursor, simple selection component 310 queries object dataset 304 via object dataset access component 320 for the object that is displayed at the cursor location. Hierarchical selection component 312 causes object dataset access component 320 to set the state of the object as "selected." Object dataset access component 320 causes object rendering subsystem 302 to redraw the selected state of the object in object selection and presentation control instance 402. The object then appears as selected, as shown in by object 612 of FIG. 6B. In FIG. 6B, the lines crossing object 612 indicate selection.

In order to select an object using object selection and presentation control instance 402, the selection cursor is positioned in the desired object cell. The selection cursor is initially positioned at a default cell location in object selection and presentation control instance 402. The default cell may be any cell within object selection and presentation control instance 402. The initial position of the selection cursor may be set programmatically before object selection and presentation control instance 402 is displayed based on a default or specified condition. An example condition may be the detection of a context of a photographic occasion. For example, if it is determined that the event is uncle Joe's birthday, then the selection cursor may be initially positioned on an object cell that contains a digital image of uncle Joe.

The selection cursor is moved in response to navigational events from navigation actuators 422, 424, 426, and 428. Each navigation actuator 422, 424, 426, and 428 may graphically indicate the direction of movement as part of the presentation of each actuator. For example, navigation actuator 424 points in the downward direction. When this actuator is pressed, the cursor will be moved in the downward direction to the next object displayed by object selection and presentation control instance 402. If the cursor is already at the bottom edge of the display, then the vector in which the cursor is positioned will be scrolled if there are additional objects in the vector that are not currently displayed. As described above, each vector 404A-404D may be a circular construct, so that navigation events in the same direction will eventually cause the display of objects to wrap around and objects that scrolled off screen will be displayed again.

An upward navigation event from a navigation actuator works in the same manner at the top of the display as downward navigation event at the bottom of the display. When the cursor is at the top of a vector and an upward navigation event is received, the objects in the vector where the cursor is located will be scrolled in the downward direction.

Left or right navigation may be implemented differently than vertical navigation. The cursor may be moved in left and right directions upon receipt of left and right navigation event from left and right navigation actuators 426 and 428. If the cursor is already on the left edge of the display and if additional vectors are logically available to the left edge of the left edge vector, then the entire contents of object selection and presentation control instance 402 may be scrolled in a right direction, introducing a new column on the left. Using the example of FIG. 4, when this type of scrolling is actuated, a grandparent column may be introduced on the left edge of the display, and the grandchildren column may be moved off the display on the right.

When a right navigation event if received, the selection cursor may be moved to the right one cell in object selection and presentation control instance 402. If the cursor is already at the right edge of the display and if additional vectors are logically available to the right of the right edge vector, then the entire contents of object selection and presentation control instance 402 may be scrolled in a left direction, introducing a new column on the right. Using the example illustrated in FIG. 4, when this type of scrolling is actuated, a great-grandchildren column will be introduced on the right edge, and the parent column will move off the display on the left.

The supported cursor movements will allow the selection cursor to be positioned on any object displayed in object selection and presentation control instance 402. In addition, the movements allow off screen objects to be moved on screen.

Returning to FIG. 1, in block 106, a method for controlling presentation and selection of objects that are digital images depicting subjects includes determining a second object, non-adjacent to the first object, based on a predefined relationship associating the first object with the second object. Referring to FIG. 6A, object 606 may be non-adjacent to object to 602. The relationship between objects 606 and 602 may be stored in object dataset 304 illustrated in FIG. 3. A system for controlling presentation and selection of objects that are digital images representing subjects includes means for determining a second object, non-adjacent to the first object based on a predefined relationship associating the first object with the second object. As described above, dataset 304 may contain a hierarchy of objects being displayed for selection in object selection and presentation control instance 402. Within dataset 304, the object hierarchy may be stored as a tree. In a tree organization, each node in the tree can maintain references to other nodes in the tree. In dataset 304, each reference may contain additional data items that provide information about relationships between objects.

One data item that may be included in each node is a state indicator that indicates whether the referenced node is a child node or a peer node. If a node is a child node, then that node is considered to be in the next subordinate generation. In object selection and presentation control instance 402, this node will be displayed in the next adjacent column that is displayed parallel and adjacent to the parent column as directed by object dataset 304. For example, objects in vector 404B is displayed to the right of objects in vector 404A in object selection and presentation control instance 402, indicating that objects in vector 404B are children of objects in vector 404A. Stated differently, objects in vector 404B represent the next subordinate generation in relation to objects in vector 404A. Peer nodes are displayed in the same vector in object selection and presentation control instance 402.

Another data item that may be stored in a node reference in dataset 304 is a relationship state indicator that indicates whether the referenced node is an immutable relationship node or coincidental relationship node. Object dataset 304 determines whether a selected node is a coincidental node based on the relationship state indicator during the processing of a selection event as described above.

The references stored with each node determine relationships between related nodes between generations. The relationships may be used to both display and affect selection operations using object selection and presentation control instance 402.

Returning to FIG. 1, in block 108, a method for controlling presentation and selection of objects that are digital images depicting subjects includes presenting the second object in a second vector adjacent to the first vector in response to the determination. A system for controlling presentation and selection of objects that are digital images depicting subjects may include means for performing the operations recited in block 108. Referring to FIG. 4, when objects are first displayed in object selection and presentation control instance 402, the objects need not be presented in any particular order. However, an initial display order can be established prior to displaying object selection and presentation control instance 402. An advantage of providing an initial display order would be the proper placement of a potential first object on the screen. It is not until the first object is selected by emphasis selection that order and layout become important.

In block 106 illustrated in FIG. 1, an object comprising a digital image representing a subject was selected using emphasis selection. When the object is selected using emphasis selection, a selection and a subsequent action may occur. In object selection and presentation control instance 402, the subsequent action contains the following steps: a sorting and positioning step and a subsequent additive selection step.

Upon receipt of input, cursor pad input component 306 forwards the emphasis selection event to hierarchical selection component 312 for processing. The selection event contains an x and y location of the selection cursor within object selection and presentation control instance 402 of FIG. 4. From this x and y location of the selection cursor, simple selection component 310 queries object dataset 304 via object dataset access component 320 for the object that is displayed at the cursor's location. Hierarchical selection component 312 calls object dataset access component 320 to set the state of the object as selected. Object dataset access component 320 then calls object sort component 314. Object sort component 314 examines the currently selected node or nodes in the relationship hierarchy and assigns the nodes related to the currently selected hierarchy of nodes to be displayed in positions in object selection and presentation control instance 402 that are adjacent to the first selected object. Object dataset access component 320 calls object rendering subsystem 302 to redraw the selected state of the object cell in object selection and presentation control instance 402. In the example illustrated in FIG. 6B, object 606, which was not adjacent to object 602 in FIG. 6A is moved to be adjacent to object 602.

FIGS. 6A and 6B demonstrate an exemplary sort process between the leftmost column and the next adjacent column to the right. In FIG. 6A, the selection cursor is positioned on object 602. Referring to FIG. 4, selection actuator component 430 may be actuated in a way that generates an emphasis selection event. This event is processed and the selection is determined as described above. The display result as shown in FIG. 6B where object 612 is selected. In FIG. 6A, object 606 is not adjacent to object 602. The sort process is applied and the sort determines that object 606 is related to object 602 while object 604 is not related. The source process updates the display positions of object 604 and 606. FIG. 6B shows that object 606 is adjacent to object 602 (shown as 612 in FIG. 6B). The sort and repositioning process continues across all of the generations in the relationship hierarchy that are represented in adjacent columns in object selection and presentation control instance 402, whether the objects are displayed or hidden.

Once sorting has been completed, object dataset 304 calls object rendering subsystem 302 to redraw the modified portions of the display area of object selection and presentation control instance 402, including objects in new positions, selection emphasis where cells are selected, and the selection cursor.

Figure 6C:
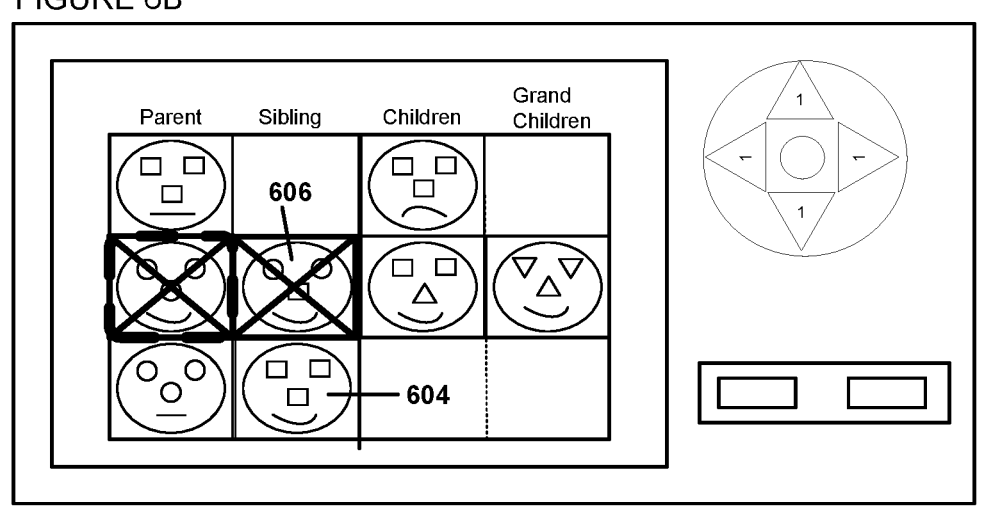

When selection actuator 430 is subsequently invoked for emphasis selection, the selection sort and display processes are again invoked. FIG. 6C shows the result of an additional cycle of the selection process. After the additional cycle, object 606 is selected.

Two embodiments with respect to the object selection process will now be described. Common to both embodiments of the selection process is the establishment of an initial selection object. This object is selected at the beginning of the selection process and defines the root node and the relationship hierarchy. From this root node, subsequent nodes are selected by traversing the relationship hierarchy and selecting nodes in each succeeding level of the relationship hierarchy.

Selection with respect to coincidental relationship peer objects and coincidental relationship children objects will now be discussed with regard to first and second embodiments. The first embodiment allows automatic selection of coincidental relationship peers and children objects in the relationship hierarchy when immutable peers and children objects in the relationship hierarchy are selected.

When a hierarchical selection begins, and progresses, the selection processes that occur will be described with regard to FIG. 5A. FIG. 5A depicts selection schematically when automatic selection of the coincidental relationship peers and children subjects is in use. Each selection rectangle indicates that the result after an emphasis selection cycle.

In FIG. 5A, object 502 has a coincidental peer relationship to object 506. This coincidental peer relationship is shown by dotted connecting line 504. Selection rectangle 536 shows that object 506 is selected when an emphasis selection is invoked on object 502. That is, object 502 is selected, and the coincidental relationship peer object 506 is also automatically selected.

When emphasis selection is invoked again on object 502, the result is shown in selection rectangle 538, and objects 512, 514, and 518 are added to the selection. Object 518 is also a coincidental relationship object with respect to object 514 as indicated by dotted line 516. Accordingly, multiple user interactions associated with the same object may automatically select related objects. For example, when emphasis selection is invoked again on object 502, the result is shown in selection rectangle 540, and objects 528, 530, 532, and 534 are added to the selection.

The second selection embodiment does not perform automatic selection of coincidental relationship peers and children objects in the relationship hierarchy when immutable peers and children objects in the relationship hierarchy are selected.

Figure 5B:
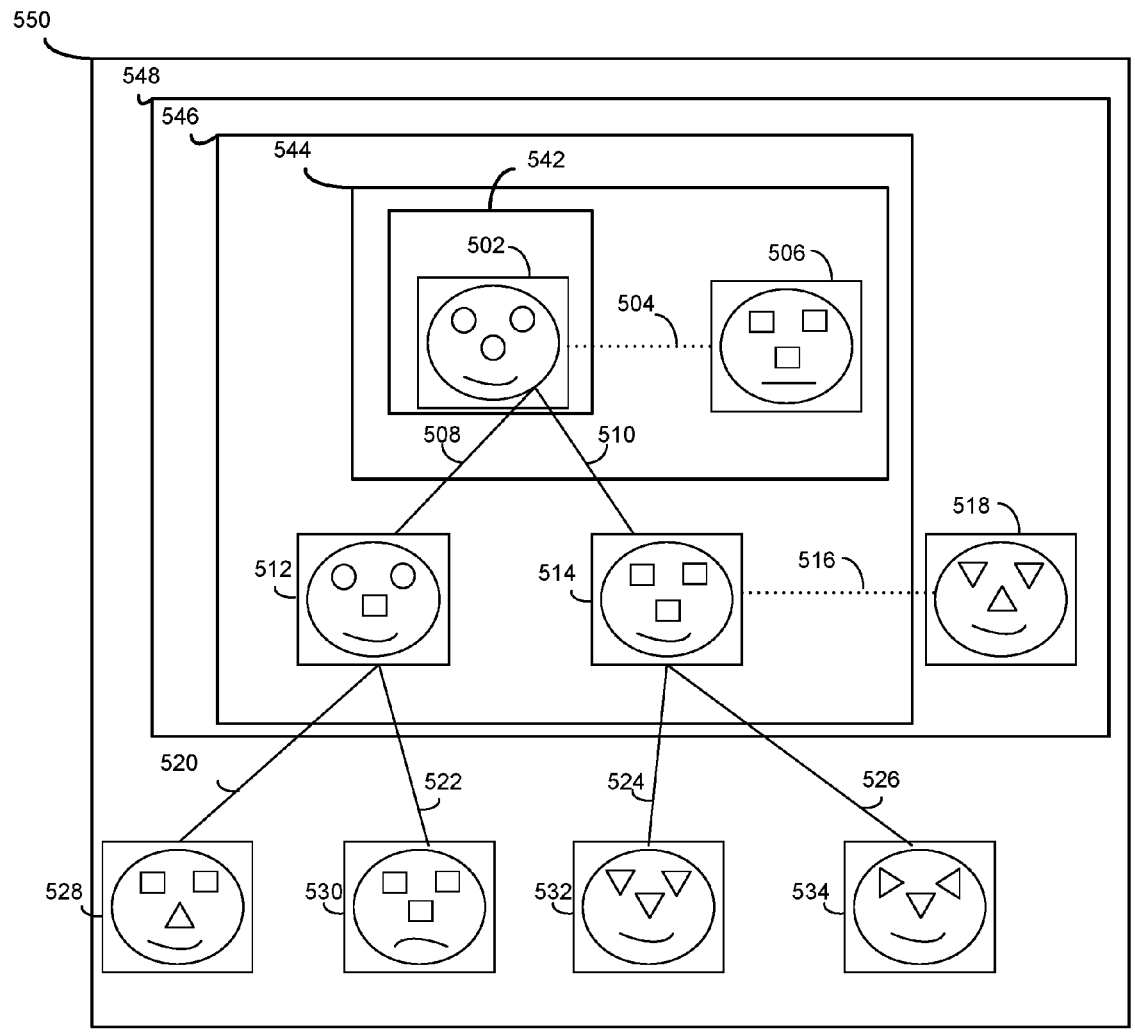
FIG. 5B is a block diagram illustrating an exemplary hierarchy of objects that may be stored in an object dataset according to an embodiment of the subject matter described herein.

FIG. 5B depicts schematically how selection operates when automatic selection of coincidental relationship peers and children objects is not performed. Each selection rectangle indicates the result after an emphasis selection cycle.

In FIG. 5B, object 502 has a coincidental peer relationship with object 506. This peer relationship is shown by the dotted connecting line 504. Selection rectangle 542 shows the objects selected when an emphasis selection is invoked on object 502. In the illustrated example, rectangle 542 indicates that when object 502 is selected, coincidental relationship peer object 506 is not also selected.

When emphasis selection is invoked again on object 502, the result is shown in selection rectangle 544. Coincidental relationship peer object 506 has now been selected.

When emphasis selection is invoked again on object 502, the result is shown in selection rectangle 546. The children relationship objects 512 and 514 have been selected, while coincidental relationship peer object 518 to child node 514 has not been selected.

When emphasis selection is invoked again on object 502, the result is shown in selection rectangle 548. Coincidental relationship peer object 518 to child node 514 is added to the selection.

When emphasis selection is invoked again on object 502, the result is shown in selection rectangle 550 and objects 528, 530, 532, and 534 are added to the selection.

As shown by FIGS. 5A and 5B, allowing automatic selection of coincidental relationship objects saves steps in the selection process over a given set of objects. In some cases however, more granular selection may de desired. In those cases, automatic selection can be turned off or either inhibited completely through settings of object selection and presentation control instance 402.

Because the hierarchical selection process is an additive process, once an object has been selected, it remains selected until the entire selection is cleared. Clearing of a selection may be invoked by a clear all function implemented by object selection and presentation control instance 402. Individual objects may be deselected by moving the selection cursor to a selected cell and invoking a simple selection using selection actuator 430. The cell then becomes deselected, but the selection of other selected cells remains unaffected.

When simple selection is used, a single object cell, at the selection cursor, upon receipt of the selection event, is selected. If the cell is currently already selected, the selection event will deselect the cell. Use of simple selection is optimal when small numbers of objects are to be selected or a larger selection of objects needs to be pruned or trimmed by a small number of objects.

Simple selection occurs when a simple selection event is captured by cursor pad input component 306 of FIG. 3. Cursor pad input component 306 passes the event to simple selection component 310 for processing. The selection event contains and x and y location of the selection cursor within object selection and presentation control instance 402 of FIG. 4. From this x and y location of the selection cursor, simple selection component 310 queries object dataset access component 320 for the object that is displayed at the cursor location. Simple selection component 310 then determines if the object and the cursor had been previously selected. In FIG. 6B, object 612 is enclosed by the selection cursor and is selected. Object 602 of FIG. 6A shows the same object in the cell but the cell is not selected.

If an object is in the selected state when a simple selection event is received, the object is deselected by simple selection component 310. In order to deselect an object, simple selection component 310 calls object database access component 320 to update the selection state of the object in object dataset 304 to "deselected." Object dataset access component 320 calls object rendering subsystem 302 to redraw the selection state of the object in object selection and presentation control instance 402.

If an object is not in the selected state when a simple selection event is received, the object is selected by simple selection component 310. In order to select the object, simple selection component 310 calls object dataset access component 304 to update the selected state of the object. Object dataset access component 320 calls object rendering subsystem 302 to redraw the selection state of the object cell in object selection and presentation control instance 402. When simple selection is used, subsequent sorting and positioning in adjacent columns may not be performed.

In the examples described above, selection of objects occurs through tactile events. In an alternate implementation, selection may occur through media recognition, such as voice recognition. For example, object dataset 304 may be preloaded with a media phrase representing each object. If the object is a digital image of a person, the media phrase may be recorded speech of the person or a media phrase identifying the person by name. In one example, voice prints may be recorded. A voice print is an encoded utterance of speech that can be compared to an utterance from a human subject to determine or identify the human subject. When voice identification of subjects is used, dataset 304 may be loaded with voice prints for each object. The voice prints for each object may be added to object dataset 304 along with the image thumbnail and any metadata associated with each object.

When a microphone on the camera (not shown) captures an utterance, the utterance is recorded in memory. A voice event containing a reference to the utterance is presented to object selection and presentation control instance 402 via voice input component 324. Voice input component 324 compares the utterance to voice prints in object dataset 304 and determines that the utterance matches a voice print for an object in object dataset 304. If a match is found in dataset 304, voice input component 324 passes a reference to the object to simple selection component 310 with an indication to mark the object as selected. Voice recognition of an object may result in selection of the object. In order to avoid oscillation between selection and de-selection, an object may not be deselected as a result of voice recognition.

Thus, when voice or other media phrase recognition is used, a camera may be activated prior to taking a photograph and voice recognition may be used to pre-select objects corresponding to subjects that may be depicted in the photograph.

In another enhancement of the subject matter described herein, a camera may include a speech synthesis system than when called with text data, converts the data to speech output. Using this output mechanism, object selection and presentation control instance 402 can be enhanced so that when control instance 402 is rendered visually on the camera's display, the speech synthesis system can also audibly enumerate a list of displayed or select objects.

The subject matter described herein can be further enhanced by adding a mechanism as disclosed in a commonly-assigned, co-pending patent application entitled Methods, Systems, and Computer Readable Media for Associating Information with a Digital Image, the disclosure of which is incorporated herein by reference in its entirety. The commonly assigned, co-pending patent application discloses, in one example, a method for automatically identifying family members in a photograph using metadata in the photograph and a genealogy database. Thus, if objects displayed in object selection and presentation control instance 402 are people, dataset 304 may store genealogical relationships between the people to facilitate selection of subjects to be included in a digital image. If the objects being displayed are goods or services, such as automobile makes and models, dataset 304 may store relationships between automobile makes and models to facilitate identification of image subjects. Similarly, if the objects displayed in a photograph are places, dataset 304 may store relationships between places to facilitate identification of places in the photograph.

Relationship information stored in dataset 304 can be used to customize the enumeration of subjects to be contextually sensitive to the photographer. For example, the relationships displayed may be displayed from the viewpoint of the photographer based on the photographer's relationship to each object in dataset 304.

Continuing with the speech synthesis example, during the object control display rendering process, object rendering subsystem 302 of FIG. 3 may call an internal object speech rendering component (not shown) to enumerate in an audio stream a list of selected objects. Object speech rendering component 322, starting at the root node selected in the database, may search for an object that matches the name of the photographer.

If the photographer is not found to be an object in object dataset 304, then the photographer has no known relationship to the objects in the database. In this case, the photographer's relationship is assumed to be unrelated to the objects, and the speech output stream is generated using the names of the objects, but no relationship information is included in the speech output stream. If the photographer is an object in dataset 304, object speech rendering component 322, using dataset 304, determines the relationships of each object to the photographer and uses this information in each subject's name in building the speech output stream. In this case, the speech stream is personalized to the photographer, allowing the photographer to understand not only each object, but the object's relationship to the root node. An example will demonstrate this enhancement. In the example, dataset 304 may contain the following information:

Father: Joe Smith
Son: David Smith (Photographer)
Son: Roger Smith (Brother of David Smith, Son of Joe Smith)
Son: Christopher Smith (Son of Roger Smith)

David Smith is designated as the photographer (previously specified, not shown). Object selection and presentation control instance 402 is rendered using the relationship-customized speech output stream and the following result is heard (relationship data shown in italics):

"The selected subjects include *father*, Joe Smith, *brother*, Roger Smith, and *nephew*, Christopher Smith."

Without the personalization, the result would be:

"The selected subjects include Joe Smith, Roger Smith, and Christopher Smith."

Thus, perspective information may be used to customize the presentation of objects in object selection and presentation control instance 402.

As described above, one potential use for the subject matter described herein is automatically associating metadata with a digital image. For example, metadata associated with objects selected in object selection and presentation control instance 402 may be extracted from object dataset 304. The extracted metadata may be automatically associated with an image in which the subjects represented by the first and second objects are depicted.

The subject matter described herein for controlling presentation and selection of objects representing digital image subjects may be implemented on any suitable device capable of storing, creating, or displaying a digital image in which it is desirable to characterize subjects. Examples of devices with which the present subject matter may be utilized include cameras, camera phones, mobile phones, smart phones, and computers.

Although in the examples described above, the subjects are described as being people, any suitable subject matter displayable on a digital image may comprise a subject. Additional examples of subjects with which the present subject matter may be utilized include goods and geographic locations.

As described above, in one embodiment, object selection and presentation control instance 402 illustrated in FIG. 4 includes circular constructs. For example, each vector 404A-404D may comprise a circular construct where a portion of the objects in each construct is visible on the display on a portion of the object in each constructs are not visible on the display. The visible and non-visible portions in each construct may be linked to each other such that a last displayed object in a construct will be followed by display of a first displayed object in a construct in response to a user navigation event. For example, when the bottom object in vector 404A is displayed, and the user selects control 424, the top most object in vector 404A may be displayed.

As stated above, relationships between objects may be coincidental or immutable. FIGS. 7A and 7B are tables illustrating exemplary coincidental and immutable relationships between entities. In FIG. 7A, examples of coincidental and immutable genealogical relationships between people are illustrated. In FIG. 7B, examples of coincidental and immutable relationships between car makes and models are illustrated. The information depicted in FIGS. 7A and 7B may be stored in dataset 304 illustrated in FIG. 3.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components can be added while still achieving the functionality described herein. Thus, the subject matter described herein can be embodied in many different variations, and all such variations are contemplated to be within the scope of what is claimed.

To facilitate an understanding of the subject matter described above, many aspects are described in terms of sequences of actions that can be performed by elements of a computer system. For example, it will be recognized that the various actions can be performed by specialized circuits or circuitry (e.g., discrete logic gates interconnected to perform a specialized function), by program instructions being executed by one or more processors, or by a combination of both.

Moreover, executable instructions of a computer program for carrying out the methods described herein can be embodied in any machine or computer readable medium for use by or in connection with an instruction execution machine, system, apparatus, or device, such as a computer-based or processor-containing machine, system, apparatus, or device, that can read or fetch the instructions from the machine or computer readable medium and execute the instructions.

As used here, a "computer readable medium" can be any means that can contain or store the computer program for use by or in connection with the instruction execution machine, system, apparatus, or device. The computer readable medium can be, for example, but not limited to, an electronic, magnetic, optical, electromagnetic, infrared, or semiconductor machine, system, apparatus, or device. More specific examples (a non-exhaustive list) of the computer readable medium can include the following: a portable computer diskette, a random access memory (RAM), a read only memory (ROM), an erasable programmable read only memory (EPROM or Flash memory), an optical fiber, a portable compact disc (CD), a portable digital video disc (DVD), and the like.

Thus, the subject matter described herein can be embodied in many different forms, and all such forms are contemplated to be within the scope of what is claimed. It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

The invention claimed is:

1. A method for controlling presentation and selection of objects that are digital images depicting subjects, the method comprising:
  presenting, via a presentation device having a screen, a plurality of objects, wherein each of at least one object is associated with at least one other object of the plurality of objects and is a digital image depicting a subject and a portion of the plurality of objects is off-screen;
  selecting a first object presented in response to a first selection event associated with the first object;
  determining a second object based on a predefined relationship associating the first object with the second object, wherein the second object is at least one of on-screen and off-screen; and
  presenting, via the presentation device, the second object on-screen and adjacent to the first object and an indication of the predefined relationship, wherein at least one preceding action of presenting the plurality of objects, selecting the first object, determining a second object, and presenting the second object is performed on at least one electronic hardware component.

2. The method of claim 1 further comprising determining metadata associated with the first and second objects and automatically associating the metadata with a digital image depicting subjects depicted in the digital images of first and second objects.

3. The method of claim 1 further comprising selecting the second object in response to a second selection event associated with the first object based on the predefined relationship.

4. The method of claim 3 wherein the first and second selection events are user interactions with the first object.

5. The method of claim 1 wherein the first selection event comprises one of a tactile selection event and a voice selection event.

6. The method of claim 1 further comprising storing a media phrase for each of the objects and wherein the first selection event comprises automatic recognition of a detected media phrase matching a media phrase stored for the first object.

7. The method of claim 1 further comprising storing synthesized speech identifying the subjects with which each of the objects is associated and wherein presenting the plurality of objects includes playing the synthesized speech for at least one of the objects.

8. The method of claim 1 wherein the subjects comprise at least one of people, goods, and geographic locations.

9. The method of claim 8 wherein the subjects comprise people and wherein the predefined relationship between the first and second objects comprises a genealogical relationship.

10. The method of claim 1 wherein presenting the plurality of objects in a plurality of rows and columns includes presenting the objects in circular constructs wherein a portion of the objects in each construct is visible on the display device, a portion of the objects in each construct is not visible on the display device, and wherein the visible and non-visible portions in each construct are linked to each other such that a last displayed object in a construct will be followed by display of a first object in the construct in response to a user navigation event.

11. A system for controlling presentation and selection of objects that are digital images depicting subjects, the system comprising system components including:
  an object selection rendering subsystem for presenting, via a presentation device having a screen, a plurality of objects, wherein each of at least one object is associated with at least one other object in the plurality of objects and is a digital image depicting a subject and a portion of the plurality of objects is off-screen;
  a navigation and selection subsystem for selecting a first object presented in response to a first selection event associated with the first object;
  an object dataset access component for determining a second object based on a predefined relationship associating the first object with the second object, wherein the second object is at least one of on-screen and off-screen; and
  wherein the object selection rendering subsystem is adapted to present, via the presentation device, the second object on-screen and adjacent to the first object and an indication of the predefined relationship, and wherein at least one of the system components includes at least one electronic hardware component.

12. The system of claim 11 wherein the object database access component is adapted to determine metadata associated with the first and second objects and to automatically associate the metadata with a digital image depicting subjects depicted in the digital images of the first and second objects.

13. The system of claim 11 wherein the navigation and selection subsystem is adapted to select the second object presented in response to a second selection event associated with the first object based on the predefined relationship.

14. The system of claim 11 wherein the first selection event comprises one of a tactile selection event and a voice selection event.

15. The system of claim 11 further comprising an object dataset for storing the objects and media phrases for the objects, wherein the first selection event comprises automatic recognition of a detected media phrase matching a media phrase stored for the first object.

16. The system of claim 11 further comprising an object dataset for storing the objects and synthesized speech identifying the subjects with which the objects are associated and wherein the object selection and rendering subsystem is adapted to play the synthesized speech for at least one of the objects.

17. The system of claim 11 wherein the subjects comprise at least one of people, goods, and geographic locations.

18. The system of claim 17 wherein the subjects comprise people and wherein the predefined relationship between the first and second objects comprises a genealogical relationship.

19. The system of claim 11 wherein the object selection rendering subsystem is adapted to present the objects in circular constructs wherein a portion of the objects in each construct is visible on the display device, a portion of the objects in each construct is not visible on the display device, and wherein the visible and non-visible portions in each construct are linked to each other such that a last displayed object in a construct will be followed by display of a first construct in the construct in response to a user navigation event.

20. A system for controlling presentation and selection of objects that are digital images depicting subjects, the system comprising components including:

means for presenting, via a presentation device having a screen, a plurality of objects, wherein each of at least one object is associated with at least one other object in the plurality of objects and is a digital image depicting a subject and a portion of the plurality of objects is off-screen;

means for selecting a first object presented in response to a first selection event associated with the first object;

means for determining a second object based on a predefined relationship associating the first object with the second object, wherein the second object is at least one of on-screen and off-screen; and means for presenting, via the presentation device, the second object on-screen and adjacent to the first object and an indication of the predefined relationship, wherein at least one of the means includes at least one electronic hardware component.

21. A non-transitory computer-readable medium embodying a computer program executable by a machine, for controlling presentation and selection of objects that are digital images depicting subjects, the computer program comprising executable instructions for:

presenting, via a presentation device having a screen, a plurality of objects, wherein each of at least one object is associated with at least one other object in the plurality of objects and is a digital image depicting a subject and a portion of the plurality of objects is off-screen;

selecting a first object presented in response to a first selection event associated with the first object;

determining a second object based on a predefined relationship associating the first object with the second object, wherein the second object is at least one of on-screen and off-screen; and presenting, via the presentation device, the second object adjacent to the first object in response to the determination and an indication of the predefined relationship.

22. The computer readable medium of claim 21 wherein the computer program includes executable instructions for determining metadata associated with the first and second objects and automatically associating the metadata with a digital image depicting subjects depicted in the digital images of the first and second objects.

* * * * *